Dec. 19, 1950     G. N. JEPPSON     2,534,518
ELECTRICALLY HEATED TUNNEL KILN
Filed April 1, 1949     5 Sheets-Sheet 1
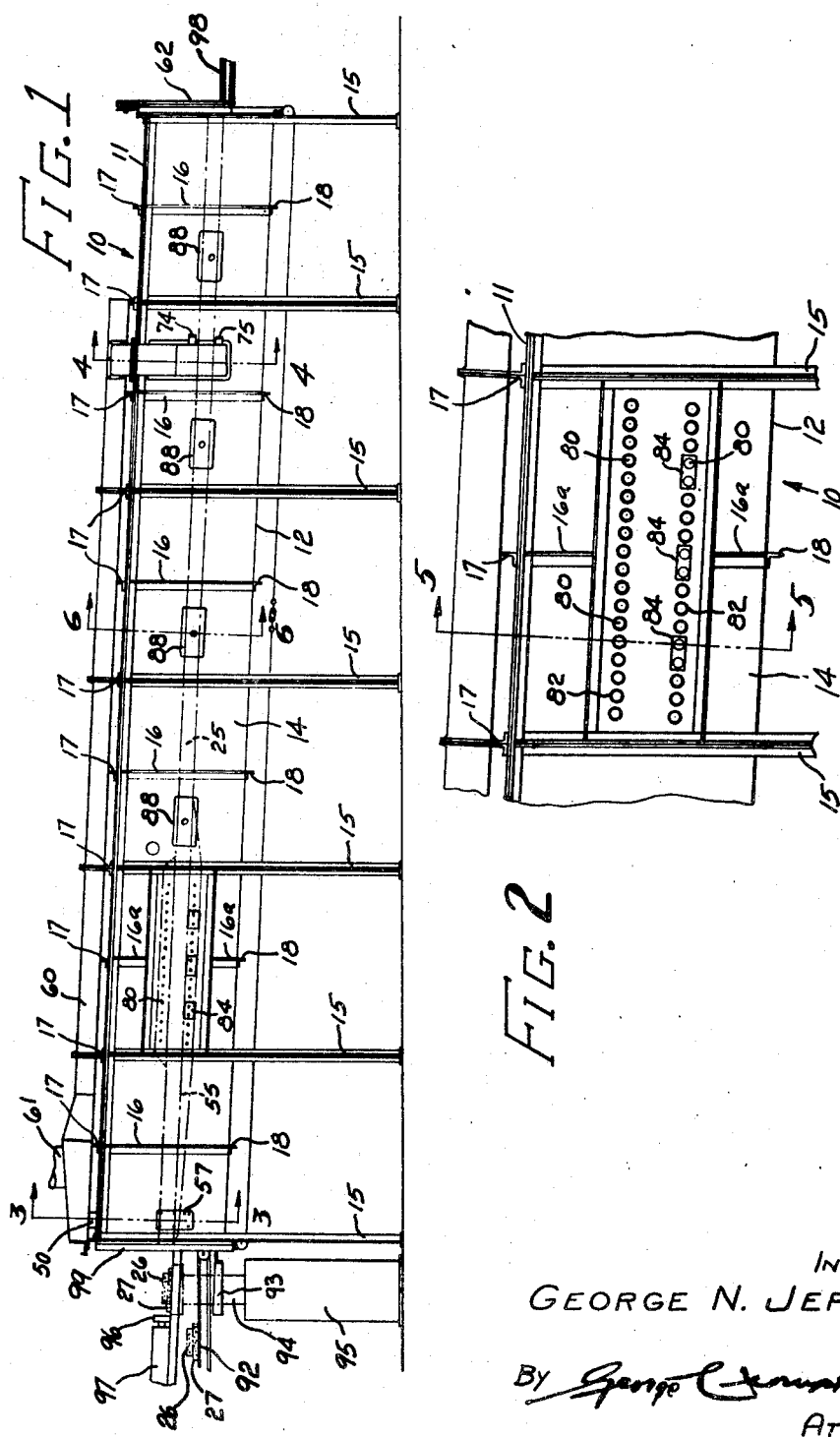
INVENTOR
GEORGE N. JEPPSON
ATTORNEY Dec. 19, 1950 G. N. JEPPSON 2,534,518
ELECTRICALLY HEATED TUNNEL KILN
Filed April 1, 1949 5 Sheets-Sheet 2

INVENTOR
GEORGE N. JEPPSON
ATTORNEY

Dec. 19, 1950 G. N. JEPPSON 2,534,518
ELECTRICALLY HEATED TUNNEL KILN
Filed April 1, 1949 5 Sheets-Sheet 3
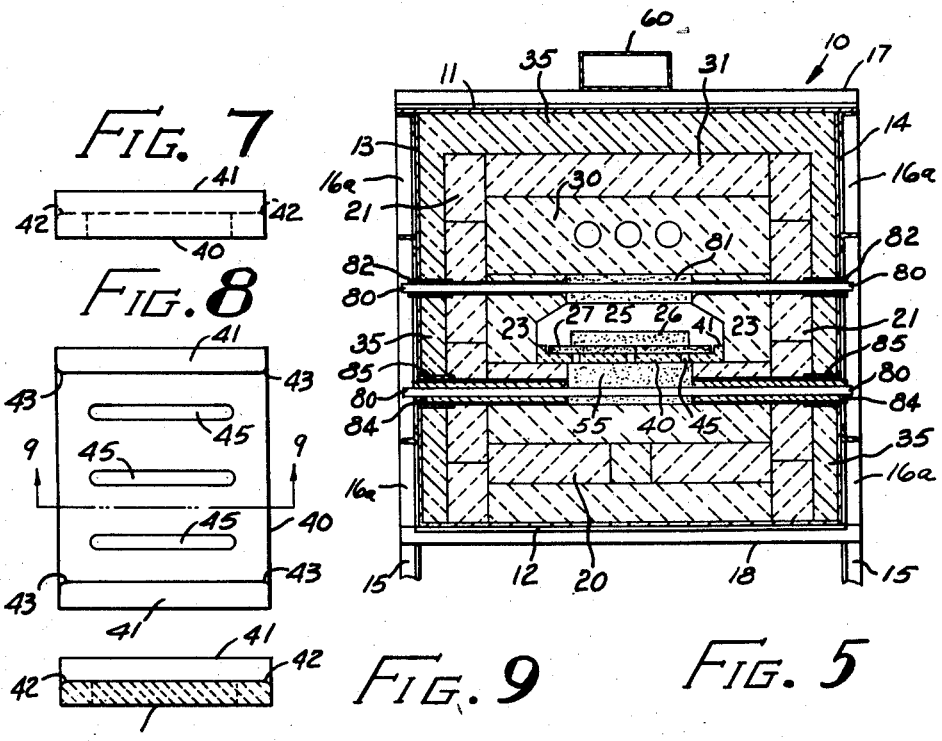
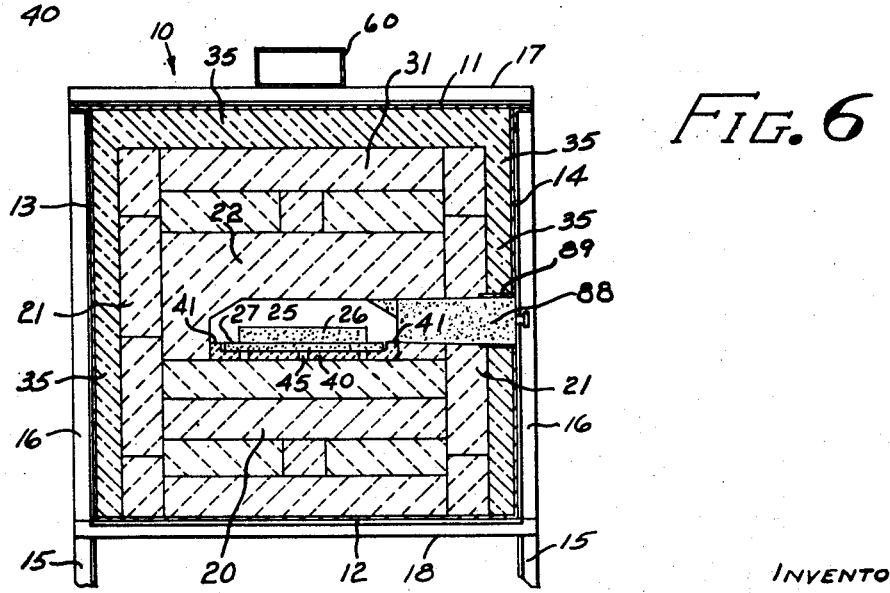
INVENTOR
GEORGE N. JEPPSON
BY
ATTORNEY Dec. 19, 1950 G. N. JEPPSON 2,534,518
ELECTRICALLY HEATED TUNNEL KILN
Filed April 1, 1949 5 Sheets-Sheet 4

Inventor
GEORGE N. JEPPSON
By [signature]
Attorney

Dec. 19, 1950 G. N. JEPPSON 2,534,518
ELECTRICALLY HEATED TUNNEL KILN
Filed April 1, 1949 5 Sheets-Sheet 5

Inventor
GEORGE N. JEPPSON
By George Crompton
Attorney

Patented Dec. 19, 1950

2,534,518

UNITED STATES PATENT OFFICE 2,534,518

ELECTRICALLY HEATED TUNNEL KILN

George N. Jeppson, Worcester, Mass., assignor to Norton Company, Worcester, Mass., a corporation of Massachusetts Application April 1, 1949, Serial No. 84,898

4 Claims. (Cl. 13—20)

The invention relates to tunnel kilns.

One object of the invention is to provide a tunnel kiln of simple and practical construction for the vitrification of grinding wheels and other ware. Another object of the invention is to provide a tunnel kiln of compact construction. Another object of the invention is to locate planes of radiant heat close to the ware being vitrified in order to avoid thermal differentials in the ware as it is being heated. Another object of the invention is to provide a tunnel kiln the moving parts of which have a mass which is actually less than that of the ware to be vitrified, thus securing economy in the heat units supplied to the kiln as compared with the mass of ware vitrified.

Another object of the invention is to provide a tunnel kiln of one or more of the characteristics indicated which can employ ordinary batts of simple rectangular configuration as the sole conveying means for the ware in the tunnel. Another object of the invention is to provide a tunnel kiln employing rectangular batts with plane faces as the sole conveying means for the ware in the kiln, and which kiln is so constructed as to deliver radiant energy directly to the undersides of the batts as well as to the upper sides of the ware. Another object of the invention is to provide a tunnel kiln of some of the characteristics indicated having a tunnel floor made in sections which can readily be removed from the tunnel and replaced when, after a period of use, the floor is unduly worn in one or more places.

Other objects will be in part obvious or in part pointed out hereinafter.

The invention accordingly consists in the features of construction, combinations of elements and arrangements of parts, all as will be illustratively described herein and the scope of the application of which will be indicated in the following claims.

In the accompanying drawings illustrating one of many possible embodiments of the mechanical features of this invention, Figure 1 is a side elevation of a tunnel kiln constructed in accordance with the invention.

Figure 2 is a fragmentary side elevation on an enlarged scale of the firing zone of the kiln.

Figure 5 is a cross sectional view on the same scale as Figures 3 and 4 taken on the line 5—5 of Figure 2.

Figure 6 is a cross sectional view on the same scale as Figures 3, 4 and 5 taken on the line 6—6 of Figure 1.

Figure 7 is a side view of one of the batt supporting plates removed from the tunnel.

Figure 8 is a plan view of such batt supporting plate.

Figure 9 is a sectional view taken on the line 9—9 of Figure 8.

Figure 3:
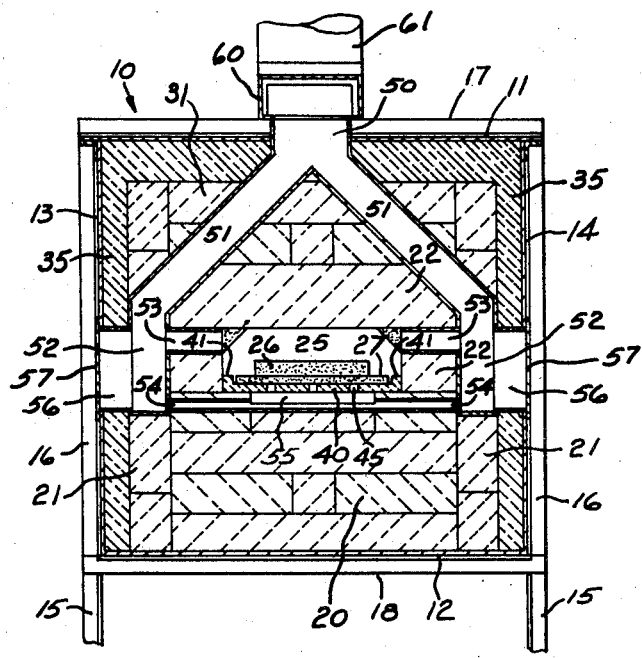
Figure 3 is a cross sectional view on an enlarged scale taken on the line 3—3 of Figure 1.

Referring to Figures 1 to 6 inclusive, the kiln may comprise a rectangular parallelepipedal box 10 made of steel plate and having a top 11, a bottom 12, a left side wall 13 and a right side wall 14. Suitably secured as by welding to the side walls 13 and 14 are legs 15 which also serve to brace and strengthen the box 10. Between successive legs 15 secured to the side walls 13 and 14 as by welding are angle iron braces 16 and 16a, the latter extending only part way from the top and bottom as shown.

Likewise the top 11 of the kiln is braced with angle iron braces 17 and the bottom 12 of the kiln is braced with angle iron braces 18. It is convenient to identify portions of the kiln by sections, each "section" being the volume of the kiln bounded by the plane of a pair of legs 15 and the plane of a pair of adjacent angle irons 16 or 16a. Thus the kiln of this particular illustrative embodiment is said to have 12 sections, and they should be numbered from the entrance end which is at the left in Figure 1 to the exit end which is at the right in Figure 1, but this division into sections does not in every case coincide with structural differences of the refractory structure of the kiln in the box 10.

Referring now to Figures 3 to 6, resting upon the bottom 12 is a mass 20 of refractory bricks substantially in the shape of a parallelepiped extending from end to end of the box 10. The bricks of this mass 20 as well as the other bricks in the box 10 may be made of any refractory material of adequate strength and thermal resistance. But I have found that a very satisfactory material is porous kaolin which makes a light weight brick that is therefore easier to handle, which makes a somewhat soft brick which is therefore easy to cut, which is sufficiently refractory to withstand a temperature of more than 1300° C., which has high thermal resistance, and which is relatively inexpensive.

On each side of the mass 20 is a wall of bricks 21 extending from the bottom 12 almost to the top 11 and extending the length of the box 10. Resting on the mass 20 which, with certain exceptions hereinafter pointed out, has a flat top, is a continuous succession of tunnel arch bricks 22, each brick being of wide U-shape configuration in upside down position with a thick top portion as shown. These tunnel arch bricks are, however, found only in sections 1, 2 and 5 to 12; the firing zone consists of sections 3 and 4 and in that zone instead of tunnel arch bricks 22 there are tunnel side bricks 23 which in section have generally the same shape of an L upside down. These tunnel arch bricks 22 and tunnel side bricks 23 partly define the tunnel 25 of the kiln through which the ware 26 such as grinding wheels being vitrified is propelled by the propulsion, preferably intermittent but possibly continuous of batts 27.

Resting on the tunnel arch bricks 22 are parallelepipedal masses 30 of bricks, one mass in sections 1 and 2 and another mass in sections 5 to 12 inclusive, these masses extending between the walls 21, and between these masses 30 are parallelepipedal masses 31 of bricks resting on the bricks 23 and extending between the walls 21. Between the wall 13 and the wall 21 as well as between the wall 14 and the wall 21 is a loose mass of insulating material 35 such as diatomaceous earth and more of this loose mass of insulating material 35 may be placed on top of the masses 30 and 31 under the top 11.

Resting on top of the mass 20 in the tunnel 25 is a continuous section of batt supporting refractory plates 40 shown in section in Figures 3 to 6 inclusive and also illustrated in Figures 7 to 9 inclusive. These batt supporting refractory plates 40 are preferably made of self-bonded aluminum oxide and they are thus highly refractory and resistant to wear. They preferably have marginal flanges 41 which are placed adjacent the vertical portions of the bricks 22 and 23 and these plates 40 have a width across the tunnel only slightly less than the width of the tunnel, just enough less so that they can be readily slid into position. Between the flanges 41 the plates 40 are substantially rectangular parallelepipeds but their top surfaces have rounded edges 42 as shown in Figure 9. Likewise the inside edges of the flanges 41 have preferably rounded vertical edges 43 as shown in Figure 8. Also all of the plates 40 in the firing zone, sections 3 and 4, have slots 45, and other plates 40 such as those illustrated in the sections of Figures 3 and 5 may have such slots 45. The rest of the plates 40 could be unslotted but it is better to have the plates 40 interchangeable so desirably all of them have the slots 45. In this connection it may be observed at this point that old plates 40 can be replaced with new plates 40 simply by pushing the whole line of plates along the tunnel as with a powerful ram and this operation may shift particular plates from one section to another section so therefore it is advisable to make every plate 40 identical with every other plate 40.

The rounded edges 42 as well as the rounded edges 43 could equally well be beveled edges. Either kind will permit batts 27 to be pushed through the tunnel without being caught by the plates 40. These may be generically referred to as smoothed edges.

Referring now to Figure 3, at the entrance end of the kiln is a flue system made out of sheet metal of a heat resistant kind and comprising a short vertical flue 50 connected to a pair of inclined flues 51 which are connected to vertical flues 52 which are connected to horizontal flues 53 and 54. The flues 54 extend through the upper part of the mass 20 and open into a well 55 under a plate 40. The flues 53 extend through a tunnel arch brick 22 to the sides of the top of the tunnel 25. Access openings 56 extend from the vertical flues 52 through the side walls 13 and 14 and are normally covered by metal cover plates 57 desirably made out of the same heat resistant metal.

The short vertical flue 50 is connected to an overhead flue pipe 60 made of sheet metal such as steel which in turn is connected to a chimney 61. It will thus be seen that hot kiln gases, partly air and partly products of combustion of temporary binder in the wheels 26, if any, will be drawn from the tunnel 25 through the flues 53, 52, 51 and 60 and the flue pipe 60 into the chimney 61. This furthermore provides a draught to draw some air from the firing zone under the pates 40 through the flues 54 and so via the flues 52, 51, 50 and 60 to the chimney 61. As will be clearly apparent from Figure 1, the entire kiln and therefore the tunnel 25 is on a slight incline and it will be noted in Figure 1 that the well 55 extends all the way from the flues 54 to the firing zone. This draught created by the chimney 61 not only exhausts products of combustion but also draws fresh air into the preheating zone which is sections 1 and 2 of the kiln, this air coming through a door 62 at the exit end of the kiln having adjustable vents not shown. Furthermore, by drawing air and gases from the firing zone through the preheating zone the latter is thereby heated so as to bring the grinding wheels 26 or other ware gradually up to the firing temperature. Suitable dampers, not shown, may be provided in the chimney 61 to control the draught.

Figure 4:
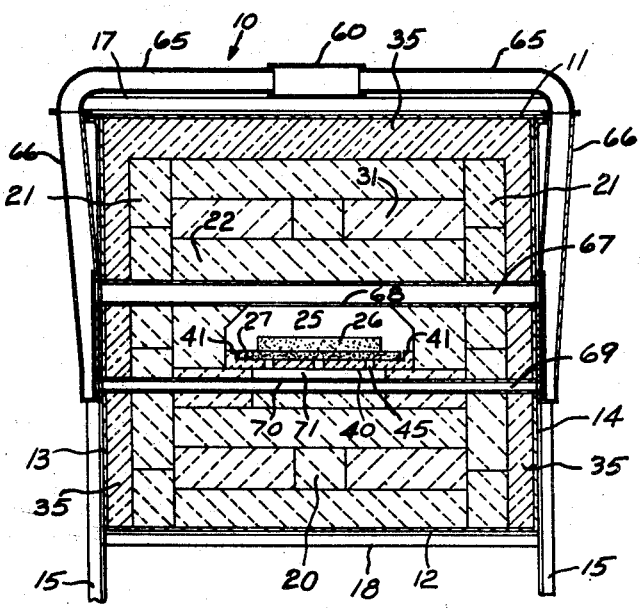
Figure 4 is a cross sectional view on the same scale as Figure 3 taken on the line 4—4 of Figure 1.

Referring now to Figure 4, it is desirable to provide an adjustable back draught to limit and control the amount of air flowing through the annealing zone, sections 5—12 of the kiln, into the firing zone so that the latter may not be cooled too much. Accordingly the overhead flue pipe 60 is a long pipe and extends from the front entrance end of the kiln to section 10 in the annealing zone and, as shown in Figure 4 taken in connection with Figure 1, it is there connected to pipes 65 which extend from the flue pipe 60 horizontally to the side of the kiln and then turn downwardly and are connected to nearly vertical pipes 66 which run downwardly along the outside of the kiln and are connected to a flue pipe 67 extending horizontally through the steel walls 14, 15, through the insulating material 35, through the walls 21 and through a tunnel arch brick 22 and having an opening 68 extending clear across the top of the tunnel 25. The pipes 66 likewise communicate with a flue pipe 69 extending horizontally through the kiln, passing through the walls 13 and 14, the insulating material 35, the walls 21 and the mass 20 and having an opening 70 extending clear across a well 71 under a plate 40, the well 71 being like the well 55 only being localized. Without further description it will be apparent that the draught caused by the chimney 61 draws some air from the tunnel 25 at section 10 in the annealing zone and the amount thereof can be regulated by slide dampers 74 and 75 (Figure 1), there being one of each on each side of the kiln controlling respectively the air flowing through the pipe 67 and the air flowing through the pipe 69.

Referring now to Figures 1, 2 and 5, in the third and fourth sections of the kiln extending between the walls 13 and 14 and also projecting slightly outside of such walls are electrical rod resistors 80 at two levels, one level under the tunnel 25 and through the well 55 and the other level through a vault 81 which is an upward extension of the tunnel 25 in the firing zone between the top portions of the tunnel side bricks 23. The resistors 80 of the upper level or bank extend through refractory sleeves 82 bridging the gap between the walls 13 and 14 and the walls 21, and they extend through the walls 21 and through the tunnel side bricks 23 as well as through the vault 81. The electrical rod resistors 80 of the lower bank or level of rod resistors extend in some cases through similar sleeves 82 and in other cases through refractory access blocks 84 that extend from the side wall 13 to the well 55 on one side of the kiln and from the side wall 14 to the well 55 on the other side of the kiln. Hollow rectangular refractory pieces 85 bridge the gaps between the walls 13 and 14 and the walls 21 as shown in Figure 5. These as well as the sleeves 82 are provided so that the resistors 80 or the access blocks 84 may be removed without spilling the insulating material 35. In any case the resistors 80 of the lower bank extend through the walls 21 and through the mass 20 as well as through the well 55.

These electrical rod resistors may be of any suitable type but preferably are made out of recrystallized silicon carbide in a manner now known to the art and have cold ends formed as by impregnating with silicon, the cold ends being all of the resistors except the portions thereof in the vault 81 and in the well 55. That is to say the heat generated by the electrical power is practically all liberated in the vault 81 in the case of the upper bank of rod resistors and in the well 55 in the case of the lower bank of rod resistors very little heat being liberated outside of the vault and the well due to the fact that those portions of the resistors in the bricks 23 or in the mass 20 or outwardly thereof are cold ended, that is to say of low resistivity as compared with those portions of the rods in the vault 81 and in the well 55. Electrical power may be delivered to the resistor rods 80 by electrical connections as is well known in the art and the power may be controlled by automatic regulators if desired; such forms no part of my invention.

It will now be seen that the upper bank of rod resistors delivers radiant heat to the top of the ware 26 while the lower bank of rod resistors delivers radiant heat to the bottom of the batt supporting refractory plates 40 and through the slots 45 direct to the batts 27. In this manner the ware 26 is vitrified by heat flowing thereinto from both sides thereof, top and bottom, thus avoiding the setting up of strains during the vitrification. The batts 27 are preferably made of bonded silicon carbide refractory material and may be of simple rectangular parallelepipedal shape. Such silicon carbide batts are good conductors of heat and also slide easily upon the self-bonded aluminum oxide plates 40. Since these aluminum oxide plates 40 are not quite such good heat conductors as the silicon carbide batts 27 the provision of the slots 45 is important since it permits the direct flow of radiant heat units from the lower bank of resistors 80 to the ware 26 and at the same time, owing to the shape of the plates 40, without mechanical interference between the batts 27 and the plates 40. It will be noted that due to the rounded corners 42 and 43 of the plates 40 the batts 27 cannot catch on the edges of the plates 40 as the batts 27 are propelled through the tunnel 25.

One advantage of a tunnel kiln constructed in accordance with this invention is that relatively large in area batts 27 can be used, since they may be made very thin being, as they are, supported all over their areas. Thin batts do not fracture from heat shock nearly as readily as thick batts. Furthermore since the batts 27 are supported over their entire areas they are not nearly so likely to break from thermal shock as if they were marginally supported only. In the manufacture of grinding wheels batt breakage has always been a problem and the cost of batts to support the wheels during vitrification has been a material percentage of the cost of manufacturing the wheels. At the same time by providing the slots 45 in the plates 40 I am enabled to achieve rapid heat transfer which is especially important in tunnel kilns of this type. The plates 40 are preferably made of self-bonded aluminum oxide rather than of silicon carbide because self-bonded aluminum oxide lasts longer at high temperatures and under thermal strains and furthermore the wearing of the batts is less with this combination than with either material alone.

The purpose of having access blocks such as the blocks 84 is for obtaining access to the well 55 or other parts of the tunnel 25 to clean out dust powder, grit, soot, or anything else which becomes lodged therein. The continual sliding of batts 27 on plates 40 produces some abrasion and produces some grit which goes into the well 55. Referring to Figure 6, I may provide access blocks 88 extending through hollow rectangular pieces 89 bridging the gap between the wall 14 and a wall 21, these blocks 88 being refractory and tapered as shown so that they can easily be removed to obtain access to the upper part of the tunnel 25. As shown in Figure 1, there may be a number of these access blocks 88.

The kiln is preferably equipped with a belt conveyor 92 at the entrance end which brings batts 27 having ware 26 one by one or two by two to a position over an elevator 93 having a plunger 94 extending into an hydraulic cylinder 95, and at intervals a ram 96 operated hydraulically by a cylinder 97 rams a batt or a pair of them into the tunnel 25 and whenever this is done, assuming the tunnel 25 is full of batts, one or two batts 27 emerge from the exit end of the kiln and are removed by a conveyor 98. The door 62 at the exit end of the kiln as well as a door 99 at the entrance end of the kiln is automatically operated to open the tunnel 25 whenever the batts are rammed. This mechanism however need not be further detailed herein since any feeding, conveying and ramming mechanism may be used, and a feeding, conveying, ramming and discharging mechanism along the lines above described is fully disclosed in my copending application with Edward Van der Pyl, Serial No. 73,312, filed January 28, 1949.

Figure 10:
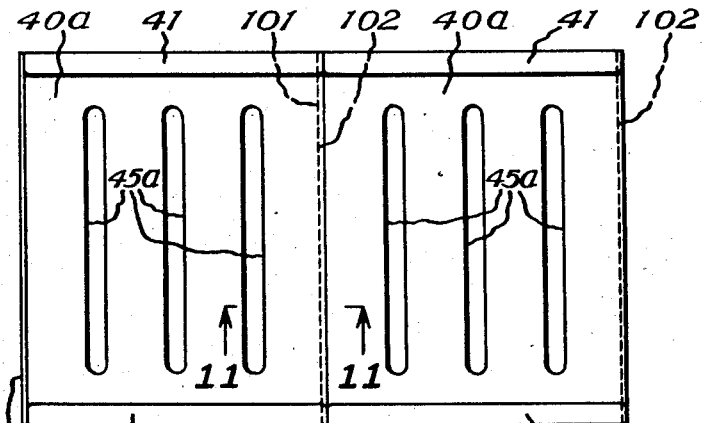
Figure 10 is a plan view on an enlarged scale of a modified form of batt supporting plate showing a pair of plates.
Figure 11:
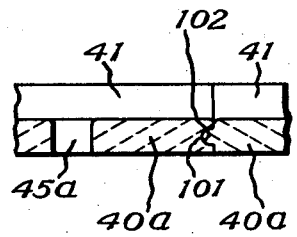
Figure 11 is a cross sectional view taken on the line 11—11 of Figure 10.

Referring now to Figures 10 and 11, batt supporting plates 40a of slightly modified form are shown. These plates have slots 45a which extend across the tunnel 25 instead of along the line of the tunnel 25. This modification has some advantages in that the plates are stronger in cross bending, that is to say it will take a heavier load to break them. Furthermore the plate 40 is completely broken if two marginal portions on either side of a slot 45 are broken while a plate 40a is not completely broken unless four portions between and outside of the slots 45a are broken. Another feature of the plates 40a is that they have interlocking tongues 101 and grooves 102 so that if one plate 40a is broken the adjacent plates 40a will uphold it. All corners and edges of the plates 40a which are contacted by the batts 27 are smoothed.

Figure 12:
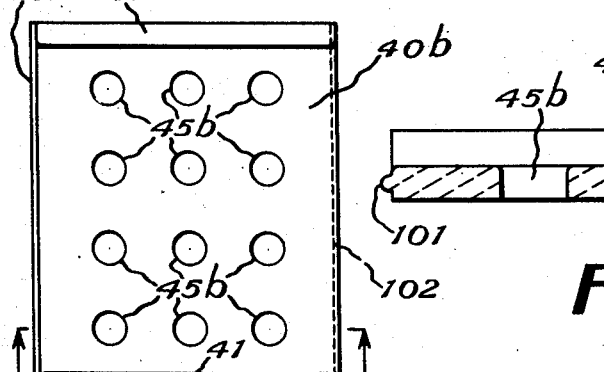
Figure 12 is a plan view on the same scale as Figure 10 of a still further modification of the batt supporting plate.
Figure 13:
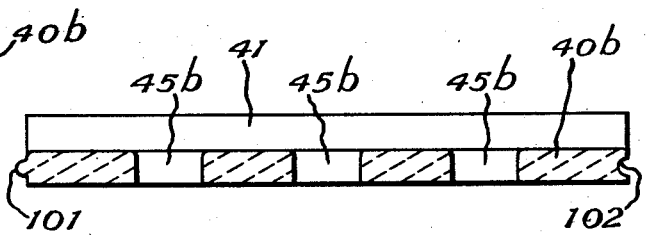
Figure 13 is a cross sectional view taken on the line 13—13 of Figure 12 on a still further enlarged scale.

Figures 12 and 13 show still another modification of the batt supporting plates. These batt supporting plates 40b of Figure 13 have holes 45b therein for the passage of heat. Again all corners and edges which contact the batts 27 are smoothed as shown. Preferably the plates 40b have tongues 101 and grooves 102 for interlocking of the plates.

Figure 14:
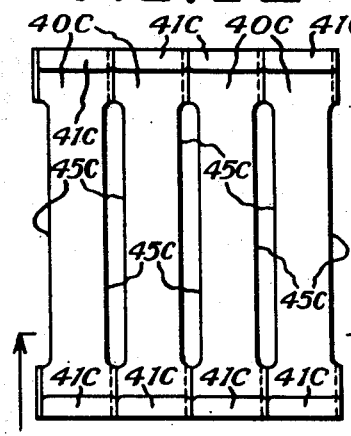
Figure 14 is a plan view on the same scale as Figure 10 of a still further modification of the batt supporting plates.
Figure 15:
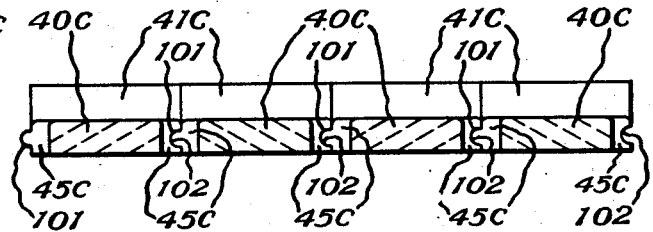
Figure 15 is a sectional view taken on the line 15—15 of Figure 14 and on the same scale as Figure 13.

Figures 14 and 15 show still another modification of the plates wherein the plates 40c are quite narrow and are provided with half slots 45c which, when the plates are assembled, constitute full slots 45c. These plates also preferably have tongues 101 and grooves 102. Again all corners and edges are smoothed. These narrow plates 40c have short marginal flanges 41c as shown.

The various slots, holes and half slots are generically known as foramina and besides transmitting heat from the lower bank of electrical rod resistors 80 to the batts 27 they serve to protect the plates against heat shock. That is to say, there is a chance for differential thermal expansion between various portions of the plates due to these foramina. The least likely of all the plates to suffer from thermal shock are the narrow plates 40c of Figures 14 and 15. But if any of them should break, they will be supported by adjacent plates due to the tongues and grooves.

Figure 16:
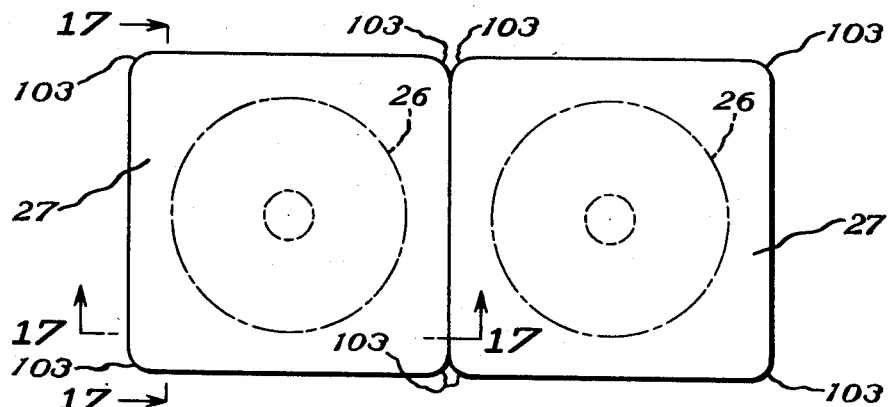
Figure 16 is a plan view on an enlarged scale of a pair of wheel supporting batts.
Figure 17:
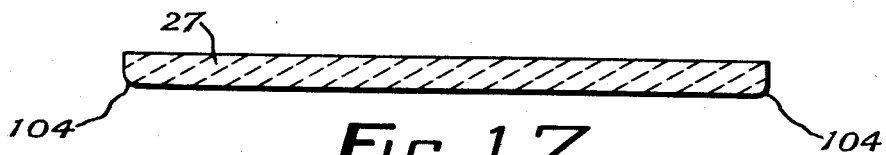
Figure 17 is a sectional view taken along either of the lines 17—17 of Figure 16 on an enlarged scale.

The batts 27 are better illustrated in Figures 16 and 17. They are rectangular parallelepipeds preferably about square but they have rounded or otherwise smoothed corners 103 and rounded or otherwise smoothed underside edges 104. These smoothed corners and edges further assist in preventing a jam in the tunnel, since due to all the rounded or smoothed corners and edges there is practically no chance of a batt mechanically interlocking with any plate. I prefer that the edges of the batts 27 be plane as thereby the thrust is carried from one plate to another plate with little danger of any resultant force at an angle to the batts or plates. Should a batt 27 fracture, it will still go through the tunnel since it will be supported by the plates 40, 40a, 40b or 40c.

Figure 18:
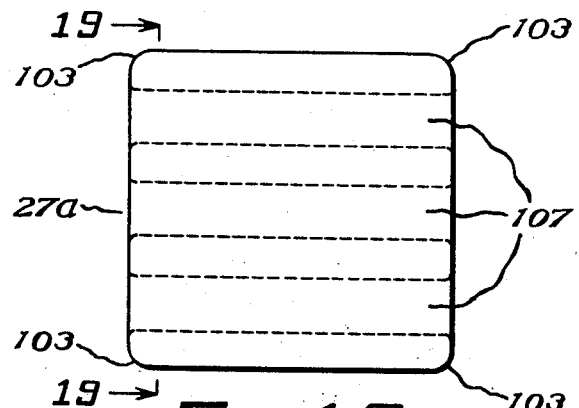
Figure 18 is a plan view on the same scale as Figure 16 of a modified form of a wheel supporting batt.
Figure 19:
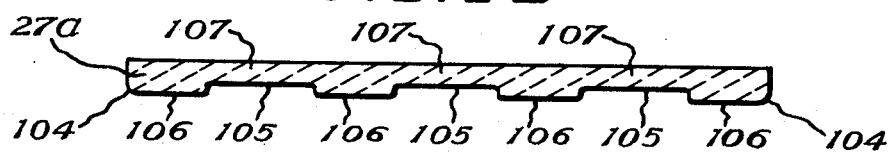
Figure 19 is a sectional view taken on the line 19—19 of Figure 18 on the same scale as Figure 17.

Figures 18 and 19 show slightly modified batts 27a with parallel grooves 105 on the underside leaving downwardly projecting skid portions 106 therebetween and outside thereof. The portions 107 of these batts 27a can be a little thinner than the batts 27 and this helps to reduce thermal shock on the batts while at the same time they slide just as easily through the kiln. The skid portions 106 should extend in the direction of the tunnel rather than across the tunnel.

It will thus be seen that there has been provided by this invention a tunnel kiln in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a tunnel kiln, a refractory structure forming an elongated tunnel, said tunnel having a firing zone constructed to have a vault and a well, an upper bank of substantially horizontal and parallel electrical rod resistors extending from side to side of and through said refractory structure and through said vault, a lower bank of substantially horizontal and parallel electrical rod resistors below said first bank extending from side to side of and through said refractory structure and through said well, said tunnel being further formed and shaped to have ledges which are substantially horizontal in the transverse direction one on either side of and above said well and bounding said well on the top thereof, a plurality of rectangular refractory plates in continuous contiguous relation in said tunnel spanning said well and resting on said ledges and extending from side to side of said tunnel and, in the firing zone, having foramina therein for the passage of radiant energy therethrough, and flat rectangular refractory batts also in continuous contiguous relation in said tunnel supported by said plates, there being a clear space between the bottom of the plates and the lower bank of electrical rod resistors in said well.

2. In a tunnel kiln as claimed in claim 1, the combination with the parts and features therein specified, of the further feature that the refractory plates are made of aluminum oxide and the batts are made of silicon carbide.

3. In a tunnel kiln as claimed in claim 2, the combination with the parts and features therein specified, of the further feature that the refractory plates have tongues on one edge and are grooved on the opposite edge and are interlocked thereby.

4. In a tunnel kiln as claimed in claim 1, the combination with the parts and features therein specified, of the further feature that the refractory plates have tongues on one edge and are grooved on the opposite edge and are interlocked together thereby.

GEORGE N. JEPPSON.

(References on following page)

REFERENCES CITED

The following references are of record in the file of this patent:

UNITED STATES PATENTS

| Number | Name | Date |
|---|---|---|
| 670,777 | Guastavino | Mar. 26, 1901 |
| 671,990 | Diescher | Apr. 16, 1901 |
| 732,545 | Graham | June 30, 1903 |
| 1,567,143 | Hay | Dec. 29, 1925 |
| 1,579,258 | Strommer | Apr. 6, 1926 |
| 1,628,273 | Richardson | May 10, 1927 |
| 1,664,219 | Lee | Mar. 27, 1928 |
| 1,799,980 | Hartford | Apr. 7, 1931 |
| 1,875,365 | Begeman | Sept. 6, 1932 |
| 2,034,721 | Howe | Mar. 24, 1936 |
| 2,320,172 | Brooke et al. | May 25, 1943 |
| 2,404,059 | Hall | July 16, 1946 |
| 2,465,137 | Van Nordstrand | Mar. 22, 1949 |

FOREIGN PATENTS

| Number | Country | Date |
|---|---|---|
| 570,113 | Great Britain | June 22, 1945 |